United States Patent
Griffiths et al.

(10) Patent No.: US 10,513,002 B2
(45) Date of Patent: Dec. 24, 2019

(54) IMPROVEMENTS TO MACHINING PROCESS CONTROL

(71) Applicant: Fives Landis Limited, Yorkshire (GB)

(72) Inventors: Selwyn Jonathan Griffiths, Northamptonshire (GB); Dermot Falkner, Yorkshire (GB)

(73) Assignee: Fives Landis Limited, Yorkshire (GB)

( * ) Notice: Subject to any disclaimer, the term of this patent is extended or adjusted under 35 U.S.C. 154(b) by 45 days.

(21) Appl. No.: 15/542,213

(22) PCT Filed: Jan. 8, 2016

(86) PCT No.: PCT/GB2016/050034
§ 371 (c)(1),
(2) Date: Jul. 7, 2017

(87) PCT Pub. No.: WO2016/110707
PCT Pub. Date: Jul. 14, 2016

(65) Prior Publication Data
US 2018/0001431 A1 Jan. 4, 2018

(30) Foreign Application Priority Data

May 18, 2015 (GB) .................................. 1508515.2

(51) Int. Cl.
*B24B 49/04* (2006.01)
*B24B 49/00* (2012.01)
(Continued)

(52) U.S. Cl.
CPC .............. *B24B 1/007* (2013.01); *B23Q 15/10* (2013.01); *B23Q 15/12* (2013.01); *B24B 5/423* (2013.01);
(Continued)

(58) Field of Classification Search
CPC .......... B23Q 15/08; B23Q 15/12; B23B 1/00; B23B 5/423; B23B 17/10; B23B 49/00;
(Continued)

(56) References Cited

U.S. PATENT DOCUMENTS 3,264,788 A 8/1966 Coes, Jr. et al.
4,766,704 A * 8/1988 Brandestini ........ A61C 13/0003
451/58

(Continued)

FOREIGN PATENT DOCUMENTS

CN 102172819 A 9/2011
EP 0088349 A2 9/1983

OTHER PUBLICATIONS

United Kingdom Intellectual Property Office, Patents Act 1977: Search Report under Section 17, Application No. GB1500259.5, dated Jun. 25, 2015 (1 page).

(Continued)

*Primary Examiner* — Timothy V Eley
(74) *Attorney, Agent, or Firm* — Wood Herron & Evans LLP

(57) ABSTRACT

A method of machining a workpiece using a machine tool, the machine tool comprising a tool mount carrying a tool, a workpiece mount carrying a workpiece, a drive mechanism for moving at least one of the tool mount and the workpiece mount relative to the other, and a control arrangement for controlling the drive mechanism. The method comprises moving at least one of the tool mount and the workpiece mount with the drive mechanism under the control of the control arrangement so that the tool contacts a portion of the workpiece to commence a machining operation, and the tool then removes material from the portion of the workpiece until completion of the machining operation, the movement being such that the relative velocity between the tool and the workpiece decreases continuously during the majority of the (Continued)

time that the tool and the workpiece are in contact with each other during the machining operation.

19 Claims, 14 Drawing Sheets

(51) Int. Cl.
*B23Q 15/12* (2006.01)
*B24B 1/00* (2006.01)
*B24B 51/00* (2006.01)
*G05B 19/416* (2006.01)
*B23Q 15/10* (2006.01)
*B24B 5/42* (2006.01)
*B24B 17/10* (2006.01)

(52) U.S. Cl.
CPC ............ *B24B 17/10* (2013.01); *B24B 49/006* (2013.01); *B24B 49/04* (2013.01); *B24B 49/045* (2013.01); *B24B 51/00* (2013.01); *G05B 19/4163* (2013.01); *G05B 2219/36293* (2013.01)

(58) Field of Classification Search
CPC ....... B23B 49/006; B23B 49/02; B23B 49/04; B23B 51/00
See application file for complete search history.

(56) References Cited

U.S. PATENT DOCUMENTS

| | | | | |
|---|---|---|---|---|
| 5,303,512 A * | 4/1994 | Tsujiuchi | ................ | B24B 1/00 451/11 |
| 6,361,647 B1 * | 3/2002 | Halley | ................ | B24B 37/042 156/345.1 |
| 6,808,438 B1 * | 10/2004 | Mavromichaelis | ....... | B24B 1/00 451/11 |
| 7,115,019 B2 * | 10/2006 | Wakazono | ................ | B24B 1/00 451/10 |
| 8,142,257 B2 * | 3/2012 | Inoue | ................... | B24B 19/125 451/10 |
| 2001/0023082 A1 * | 9/2001 | Vepa | ......................... | B24B 1/00 438/14 |
| 2008/0188161 A1 * | 8/2008 | Bremer | .................... | B24B 1/00 451/5 |
| 2014/0213147 A1 * | 7/2014 | Tanaka | ................. | G05B 19/401 451/5 |
| 2018/0021919 A1 * | 1/2018 | Lehner | ................. | B24B 49/006 438/464 |

OTHER PUBLICATIONS

European Patent Office, International Search Report and Written Opinion of the International Searching Authority, International Application No. PCT/GB2016/050034, dated May 19, 2016 (11 pages).

\* cited by examiner

| Distance to Size (mm) | Velocity Ratio |
|---|---|
| 1 | 100.00% |
| 0.2 | 50.00% |
| 0.04 | 40.00% |
| 0.01 | 2.00% |
| 0 | 1.00% |

IMPROVEMENTS TO MACHINING PROCESS CONTROL

CROSS-REFERENCE TO RELATED APPLICATION

This application is a submission under 35 U.S.C. § 371 of International Application No. PCT/GB2016/050034, filed Jan. 8, 2016, which claims priority to Great Britain Application No. 1500259.5, filed Jan. 8, 2015 and Great Britain Application No. 1508515.2, filed May 18, 2015, the disclosures of which are hereby expressly incorporated by reference herein in their entireties.

FIELD OF THE INVENTION

The present invention relates to improvements in the control of machining processes carried out using a machine tool. This includes but is not limited to processes involving the use of a grinding wheel and/or a rotating workpiece.

BACKGROUND OF THE INVENTION

In machining processes, material is removed from a workpiece by a tool. The tool is advanced into the workpiece until it reaches a position where the workpiece is at its final finished size. For example, in abrasive or grinding machining processes, the material is removed by a large number of cutting points held in a friable matrix which may be in the form of a grinding wheel.

In existing machining processes, an operation to bring a portion of a workpiece to its final size is divided into a number of distinct, separate phases. Commonly, these phases may be denoted as "fast", "medium" and "slow" feed operations. An example of process control in this way is illustrated in FIG. 8 of US 2014/0213147. Here, three grinding phases are denoted as "rough grinding", "precise grinding" and "fine grinding".

In these known grinding processes, the infeed parameters (such as the relative velocity between the tool and an axis about which the workpiece is rotating) are determined for each phase. This is with a view to achieving safe material removal whilst avoiding structural damage such as burn-related loss of hardness. The rate of material removal is set at a different level in each phase as the workpiece approaches size to minimise geometric errors. Each step therefore has a constant feed rate (or relative velocity) which is reduced from one step to the next during the approach of the wheel to the finished workpiece size.

SUMMARY OF THE INVENTION

The present invention provides a method of machining a workpiece using a machine tool, the machine tool comprising a tool mount carrying a tool, a workpiece mount carrying a workpiece, a drive mechanism for moving at least one of the tool mount and the workpiece mount relative to the other, and a control arrangement for controlling the drive mechanism, wherein the method comprises moving at least one of the tool mount and the workpiece mount with the drive mechanism under the control of the control arrangement so that:
the tool contacts a portion of the workpiece to commence a machining operation; and
the tool then removes material from the portion of the workpiece until completion of the machining operation, the movement being such that the relative velocity between the tool and the workpiece decreases continuously during the majority of the time that the tool and the workpiece are in contact with each other during the machining operation.

Known machining processes involve step changes in the velocity of the tool relative to the workpiece. This causes abrupt changes in the movement of the tool and corresponding high jerk characteristics which can lead to sudden bursts in grinding power and machining errors. The step changes from one phase to the next are controlled by position data with reference to the finished size. During each step change, it may be necessary to allow a delay for the machine tool to settle and recover after the infeed has been halted. This suspension of the feed towards size may be accompanied by a small retraction away from the workpiece in a further effort to avoid damage to the workpiece where the grinding forces might be temporarily relaxed. Also, it may be necessary to wait for the completion of the rotation of the workpiece before recommencing machining at the velocity of the next stage. This is because the halting of the infeed at a particular point in the rotation of a workpiece will create a discontinuity in the surface being machined and machining will need to be restarted at a point beyond this discontinuity. Such suspension of the feed towards size or small retractions from the workpiece can be time-consuming, adding to the overall time taken for the workpiece to be machined to its finished size.

These undesirable characteristics and delays associated with existing processes are addressed by the present invention. The control arrangement (for example the control system of a CNC machine tool) demands a continually decreasing relative velocity during at least the majority of the time that the tool and workpiece are in contact. Abrupt accelerations and decelerations may be reduced or avoided. Also, the time taken to remove the grinding stock from a workpiece can be reduced by avoiding delays of the nature referred to above which are associated with existing phase-by-phase machining control.

The term "relative velocity" is used herein to refer to an infeed rate of the tool into the workpiece as a result of movement of at least one of the tool and workpiece relative to the other.

The relative velocity demanded by the control arrangement between the tool and the workpiece may decrease continuously during at least 80%, or more preferably at least 90%, or indeed the entire time that the tool and the workpiece are in contact with each other during the machining operation. The profile of relative velocity against time whilst the relative velocity between the tool and the workpiece decreases continuously may be linked to a continuously declining rate of material removal as the workpiece approaches its finished size.

The profile of relative velocity against time for a machining operation may be calculated to minimise the time taken to arrive at the finished component dimensions whilst keeping below the maximum material removal rate dictated by the burn threshold for a given operation.

The relative velocity profile may be calculated so as to reach a relative velocity of zero or very close to zero at the finished workpiece size. For example, this final velocity may be in a range from 0 to 0.02 mm/s.

The relative velocity achieved at the start of a machining operation may be calculated to correspond to a material removal rate that is less than a predetermined specific material removal rate (SMRR) threshold. Prior to contact between the tool and the workpiece, there may be a rapid movement resulting in a relative velocity greater than the initial relative velocity demanded as the tool and workpiece come into contact, followed by a deceleration to that initial relative velocity.

A machining operation is preferably completed by the method according to the invention by machining the portion of the workpiece to a desired size or more preferably its finished size.

The method preferably comprises the step of calculating a profile of relative velocity against time to be achieved between the tool and the workpiece over the course of the machining operation using a velocity profile generation algorithm.

In some embodiments, the velocity profile generation algorithm comprises a second or higher degree polynomial. In other embodiments, the velocity profile generation algorithm comprises a term which decreases exponentially with respect to time. In further preferred approaches, the relative velocity profile is calculated with reference to a plurality of predefined combinations of time and velocity.

In yet further embodiments, the relative velocity profile is calculated with reference to a plurality of predefined combinations of the depth of material remaining to be removed from the workpiece with fractions of the relative velocity achieved when the machining operation is commenced.

The relative velocity profile may be determined with reference to a plurality of predefined points in the course of a machining operation by using a spline fitting algorithm.

In embodiments of the invention, at a predetermined point partway through the machining operation, at least one dimension of the portion of the workpiece being machined is detected, and a new relative velocity profile to be achieved between the tool and the workpiece over at least a portion of the remainder of the machining operation is determined with reference to the detected dimension.

Removal of material from the workpiece may be suspended during the step of detecting at least one dimension of the portion of the workpiece.

Machining operations according to embodiments of the invention may include suspension of the removal of material from the workpiece whilst the machine tool switches from one coolant regime to another.

In some embodiments, removal of material from the workpiece continues during the step of detecting at least one dimension of the portion of the workpiece. In this way, a measurement may be taken and any adjustment needed to the machining operation made without any significant increase of the time taken to execute the machining operation. The machine tool may be configured to determine and implement any required adjustment as the machining operation continues without needing to pause the material removal. In this way the machining operation may be continuous and able to be smoothly executed whilst incorporating any necessary corrections.

The inventors have realised that although carrying out a measurement whilst removal of material from the workpiece is ongoing may not be as accurate as obtaining a measurement whilst material removal is paused as the size of the workpiece will be continuing to change, the measurement obtained is nevertheless sufficiently accurate to provide a good measure of any need for adjustment.

The detection of a dimension of the portion of the workpiece may be carried out once or a plurality of times during a machining operation. More preferably, the measurements may be obtained on a continuous basis during some or all of the machining operation. In this way, the measurement(s) can be used to detect any deviations from the expected workpiece size in the course of the machine operation, for example due to distortions of a machine or thermal or other process related effects on the material removal operation. The measurement data may be used multiple times during a machine operation to calculate any adjustments needed to ensure that the workpiece reaches its target size. A dimension may be detected, using a size gauge for example, at any time after an initial rapid approach of the tool towards the workpiece until a point where the acquisition of size would no longer be useful to control the finish size.

In a preferred embodiment, the step of determining the new relative velocity profile comprises:

calculating a value of a velocity modifier parameter which corresponds to a displacement forwards or backwards in time along the relative velocity profile that is currently being followed, by reference to the difference between the measured size of the detected dimension and the expected size of the detected dimension at that point in the machining operation, the displacement being calculated to correct for this difference in order to achieve a desired final value of the dimension at the end of the machining operation; and adjusting a current position along the current relative velocity profile with reference to the calculated value of the velocity modifier parameter.

Accordingly, a portion of the current relative velocity profile may be used in the new velocity profile, with the velocity modifier parameter adjusting the current position along the original profile to define the new profile, with a view to ensuring that the target size is reached when the end of the velocity profile is reached at the end of the machining operation. Preferably, this adjustment ensures that the arrival at the target size coincides with the relative velocity reaching zero or very close to zero.

In a preferred embodiment, the control arrangement may determine an intervening velocity profile which provides a smooth transition between the current relative velocity profile and the new relative velocity profile. This enables any adjustment to the relative velocity to be implemented smoothly.

In a preferred embodiment, after the dimension has been detected, the measured size of the detected dimension is compared to upper and/or lower threshold values for the expected size of the detected dimension at that point in the machining operation and a new relative velocity profile is only determined if the detected dimension is beyond one of the thresholds.

In this way, the progress of the machining operation towards the desired finish size for the workpiece is adapted with reference to a size control window or "flight path" defined by upper and/or lower threshold values associated with corresponding points in the machining operation. If the detected dimension is found to be outside the size control window for the current position in the machining operation, the current velocity profile end point will no longer be suitable for controlling the final infeed position of the tool. A new relative velocity profile is then determined which is calculated to bring the workpiece to the required size at the end of the machining operation.

Preferably, the difference between the upper and lower thresholds decreases periodically or continuously during the machining operation to reduce the acceptable deviation from the expected workpiece size as the workpiece approaches its final size.

The tool may be a grinding wheel for example.

The machine tool may be configured to rotate the workpiece about a reference axis during the machining operation.

It will be appreciated that references herein to the relative velocity of the tool and workpiece encompass relative motion due to movement of the tool relative to the workpiece, or vice versa, or a combination of both.

The invention also provides a machine tool configured to carry out a method of any preceding claim comprising a tool mount for carrying a tool, a workpiece mount for carrying a workpiece, a drive mechanism for moving at least one of the tool and the workpiece relative to the other and a control arrangement for controlling the drive mechanism.

BRIEF DESCRIPTION OF THE DRAWINGS

Prior art processes and embodiments of the present invention will now be described by way of example and with reference to the accompanying schematic drawings, wherein.

DETAILED DESCRIPTION OF THE INVENTION

Figure 1:
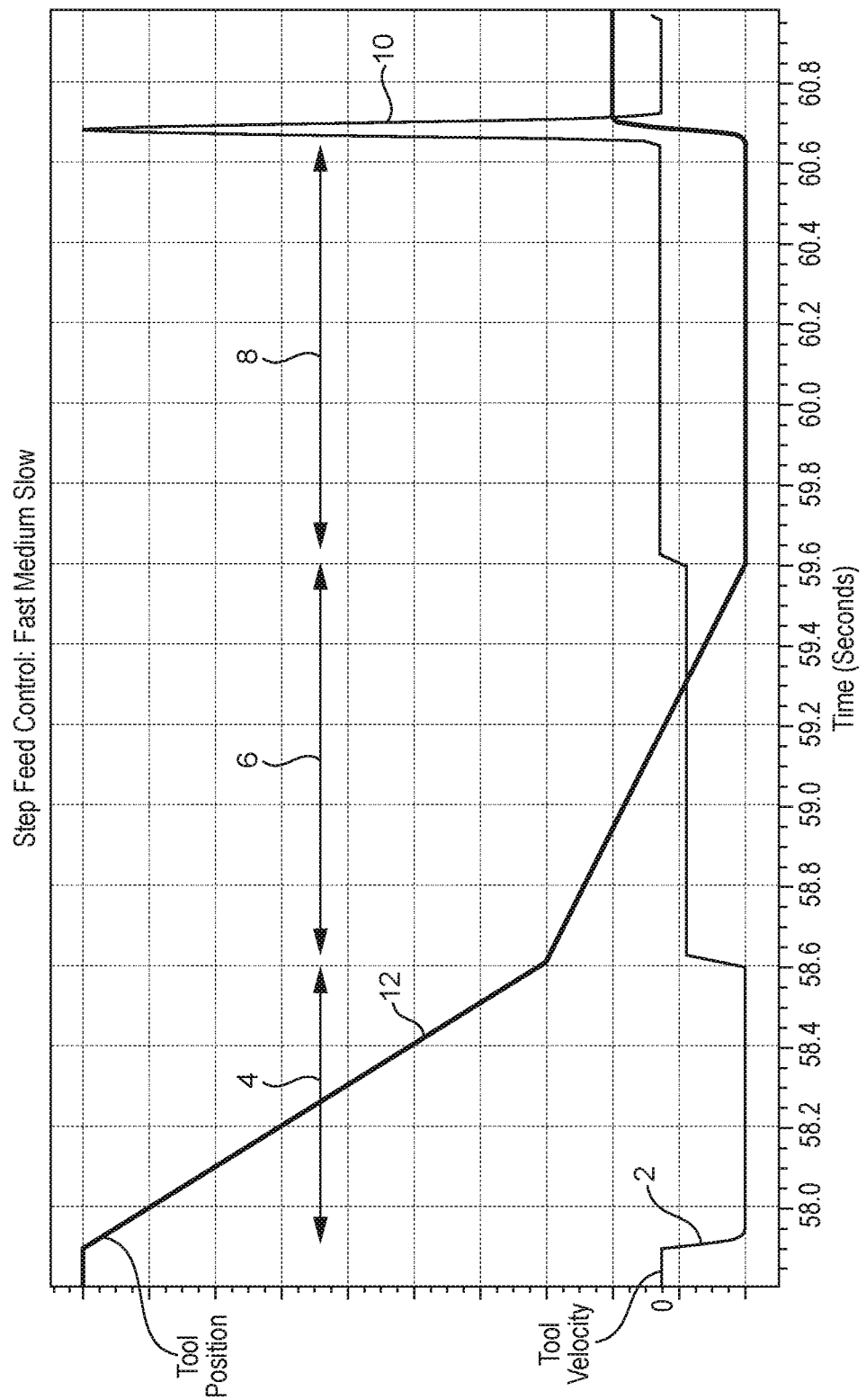
FIG. 1 shows plots of tool velocity and position against time for a known machining operation comprising "fast", "medium" and "slow" tool feed rates.
Figure 2:
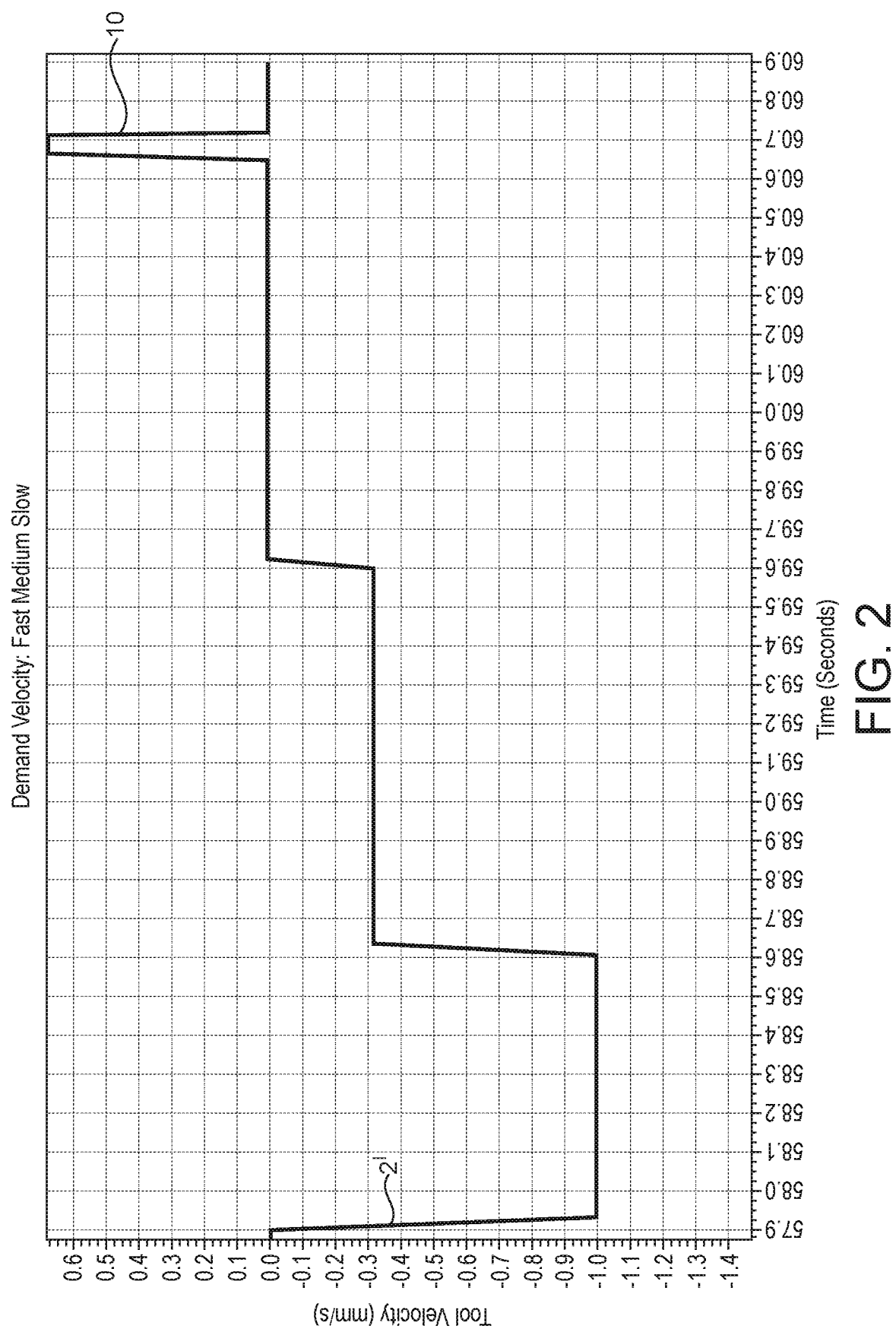
FIG. 2 shows a portion of the tool velocity plot of FIG. 1 with a larger scale on the vertical axis.

FIGS. 1 and 2 illustrate a known machining operation using phase-by-phase piecewise feed control. FIG. 1 shows a plot 2 of tool velocity relative to the is workpiece against time. It includes three distinct phases 4, 6 and 8 corresponding to "fast", "medium" and "slow" feed rates, respectively.

FIG. 2 shows the same machining operation in which a portion 2' of the tool velocity plot 2 is shown with a larger scale on the vertical axis. In FIG. 2 (and other similar figures), negative values of tool velocity on the y axis represent movement towards the workpiece, with positive values representing movement away from the workpiece. Feature 10 is a spike in the plot corresponding to a short controlled retraction of the tool from the workpiece surface to avoid microscopic surface finish defects in advance of a rapid retraction and movement of the tool to the next workpiece portion to be machined. The magnitude of the tool velocity towards the workpiece during the slow feed phase is greater than zero, but too small to be discernible in this plot.

Graph 12 in FIG. 1 is a plot of the position of the tool along the physical machine axis carrying the tool against time.

For clarity, the plots of FIGS. 1 and 2 show the demanded tool position and therefore do not include effects occurring in practice caused by the cutting process.

In FIGS. 1 and 2 it can be seen that in the transition from one phase to the next, there is a brief, rapid deceleration of the tool relative to the workpiece until the velocity of the next constant velocity phase is reached.

Figures 3, 4:
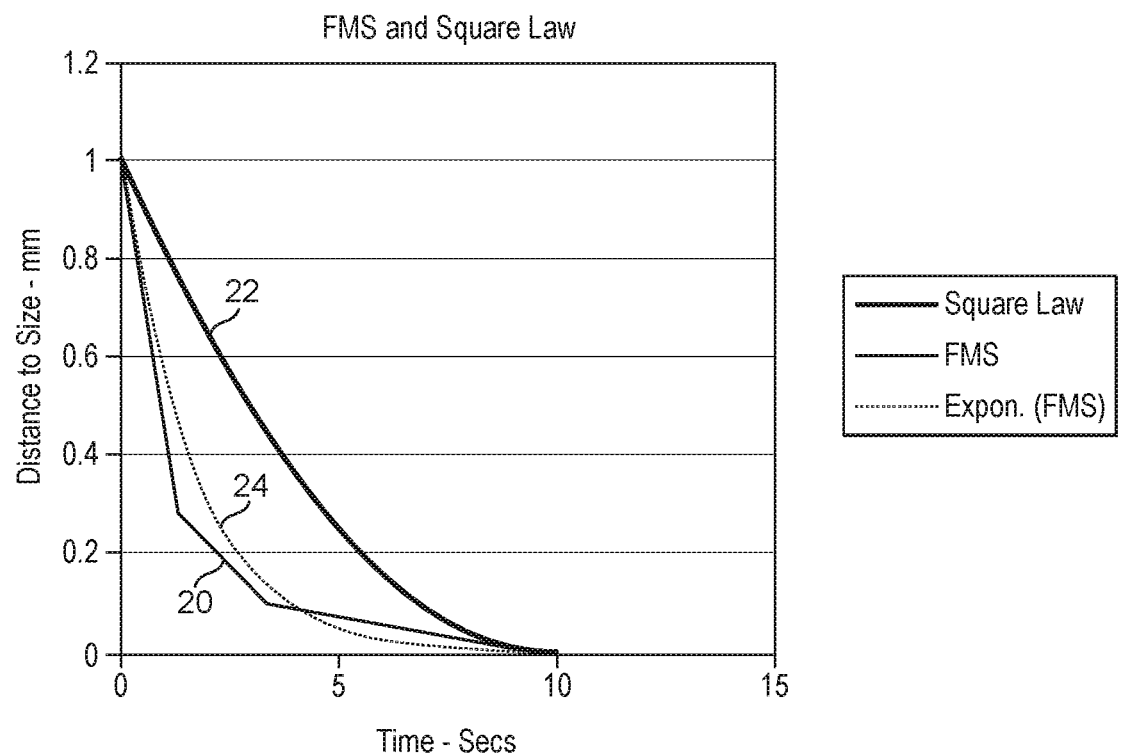
FIG. 3 shows a plot of distance to finished size of the workpiece against time for a known machining operation and embodiments of the invention.
FIG. 4 is a table of combinations of distance to the finished size of the workpiece against the tool velocity as a percentage of its velocity at the start of the machining operation.

FIG. 3 is a plot of the distance to be travelled by the tool to the finished size of the workpiece against time according to three different machining operations.

A plot similar to plot 12 of FIG. 1 is also shown in FIG. 3 as plot 20. Plot 20 corresponds to a known type of machining operation including fast, medium and slow phases (an "FMS" procedure). In this example, the fast feed velocity is −0.55 mm/s, the medium feed velocity is −0.12 mm/s and the slow feed velocity is −0.018 mm/s. The workpiece is machined to its finished size in approximately 9.5 seconds. The operation is completed during a further 0.5 seconds in which the workpiece is rotated without further infeed of the tool. These feed rates are consistent with typical feed rates used in crankshaft grinding as an example, where the amount of material to be removed (the "stock level") is of the order of 1 mm.

Plot 22 represents a velocity profile calculated in accordance with the present invention. It was determined by fitting a second order curve (in other words a second degree polynomial expression) to the start and finish points of the FMS procedure. It can be seen that the relative velocity between the tool and the workpiece decreases continuously from the start to the finish of the machining operation.

Plot 24 represents a further embodiment of the present invention. This velocity profile was determined by fitting an exponentially decreasing curve to the start and finish points of the FMS procedure. In another embodiment, a spline fitting technique is used to generate the velocity profile (an example is not shown in FIG. 3).

It has been found that a continuously decreasing velocity profile may be fitted to the start and finish points of a conventional FMS operation, with the initial velocity of the tool infeed lower than the FMS initial infeed velocity, whilst still achieving the finished workpiece size over a similar or even shorter timescale.

Figure 5:
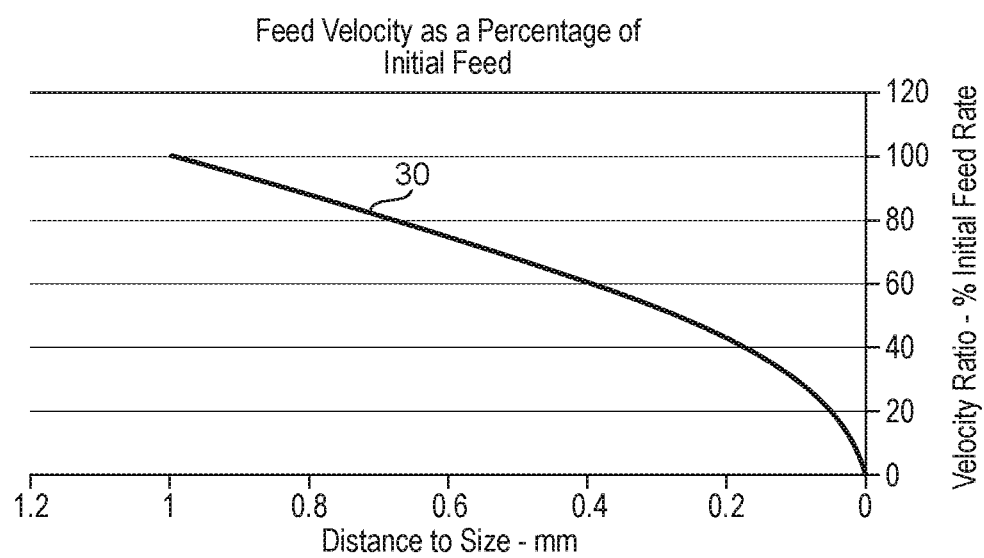
FIG. 5 is a velocity profile generated from the parameters indicated in the table of FIG. 4.
Figure 6:
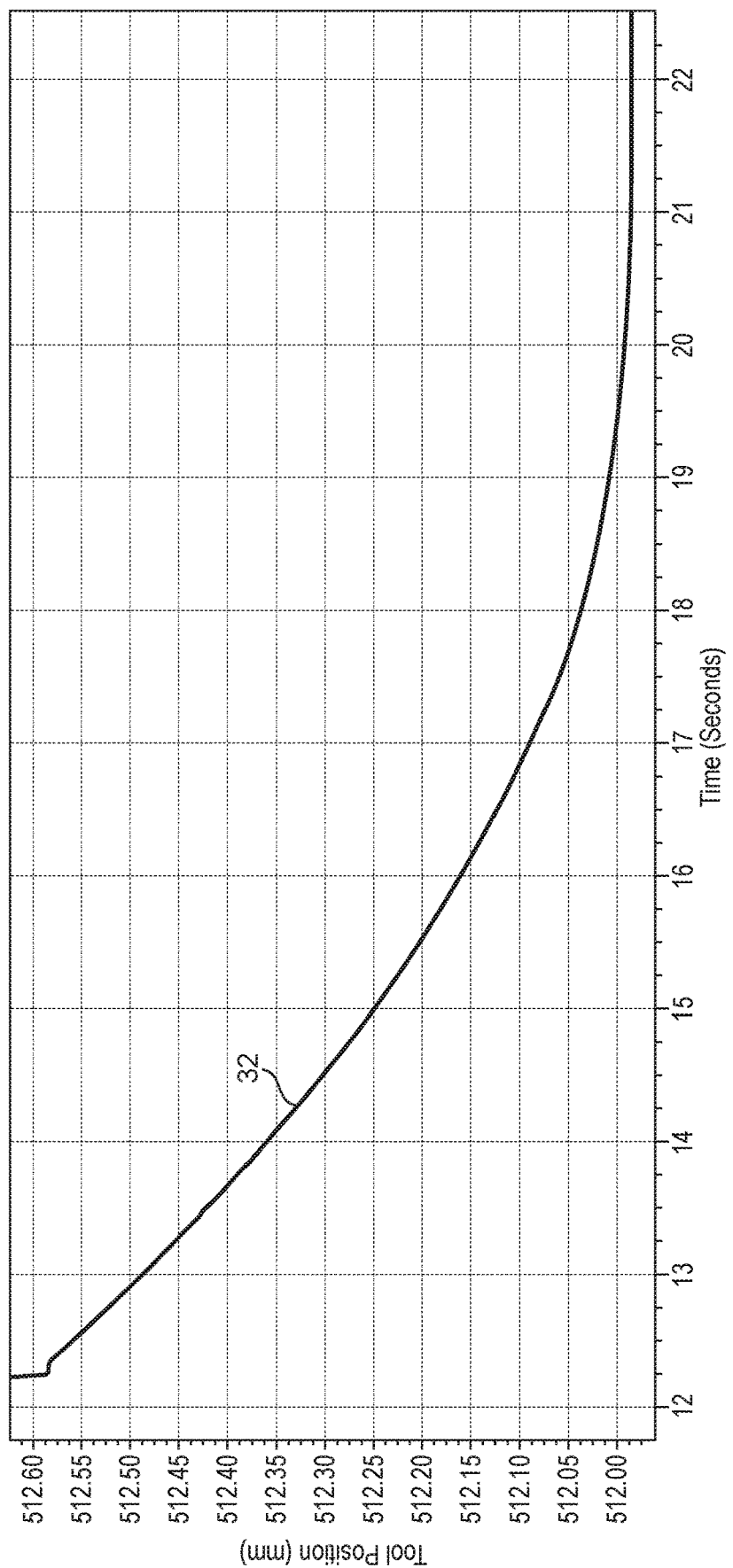
FIG. 6 is a plot of tool position against time corresponding to the machining operation represented by FIG. 5.

FIGS. 4 to 6 illustrate how a velocity profile embodying the present invention may be determined with reference to a plurality of predetermined intermediate points in a machining operation.

By way of example, FIG. 4 is a table identifying a number of intermediate points representing target points identified by a user to guide a grinding operation. At each point, for a given distance remaining to be travelled by the tool to the finished position at which the workpiece has been ground to size, a relative velocity between the tool and the workpiece is specified as a percentage of its velocity at the start of the machining operation. These points are then inputted into a curve fitting process to derive a velocity profile guided by these points (but not necessarily passing exactly through each point between the start and end points) in which the relative velocity between the tool and the workpiece decreases smoothly and continuously during the machining operation. A curve 30 based on the points shown in FIG. 4 is illustrated is in FIG. 5.

The curve of FIG. 5 may then be used to calculate a velocity profile having a continuously reducing velocity as the target workpiece size is approached. The timescale of the machining operation is determined such that the initial velocity does not result in an excessive SMRR at the start of the machining operation. In a grinding procedure, SMRR is generally measured in terms of the volume of material removed per unit width of the grinding wheel per second.

An example of a resulting velocity profile is illustrated in FIG. 6. In this embodiment, the tool engages the workpiece at the time 12.25 seconds, at a position along the physical machine axis carrying the tool measured at 512.575 mm. The machining process then is completed after around 10 seconds, with the tool position at 511.95 mm along its axis.

In a preferred embodiment, a method of machining a workpiece may involve the following sequence of steps:
The target position for the tool, at the point where the portion of the workpiece to be machined has been ground to its finished size, is determined;
The starting position for the tool is determined with reference to the target position plus the amount of stock material to be removed plus any additional "runout";
The initial relative velocity between the tool and the workpiece is determined so as to be less than the maximum that the process can tolerate before burn occurs;
A relative velocity profile is calculated with reference to the initial feed velocity and achievement of a velocity at or very close to zero at the finished workpiece size, using a curve fitting routine or algorithms which may be stored in the controller of the machine tool or a separate processor;
Rapid movement is added at the start of the machining operation to arrive at the start position where the tool is in contact with the workpiece, to minimise the time taken for the machining operation. This includes a deceleration to the initial feed control velocity calculated above;
Where the component has been finished using target positions only (designated as a "timer grind") then the feed velocity is controlled to follow the velocity profile until it reaches zero at the target position. The final size accuracy of the workpiece relies on the calculations for the target position based on the original calibration of the machine's feed control axis and its absolute position with respect to the location of the workpiece and, additionally, on small allowances which are included for process related variations in temperature of the machine's axes and deflections caused by process forces. With this approach, no measurements of residual stock levels are taken during the machining process which would allow accurate compensations to be included which may be related to changes in ambient conditions such as temperature and humidity.

Figure 7:
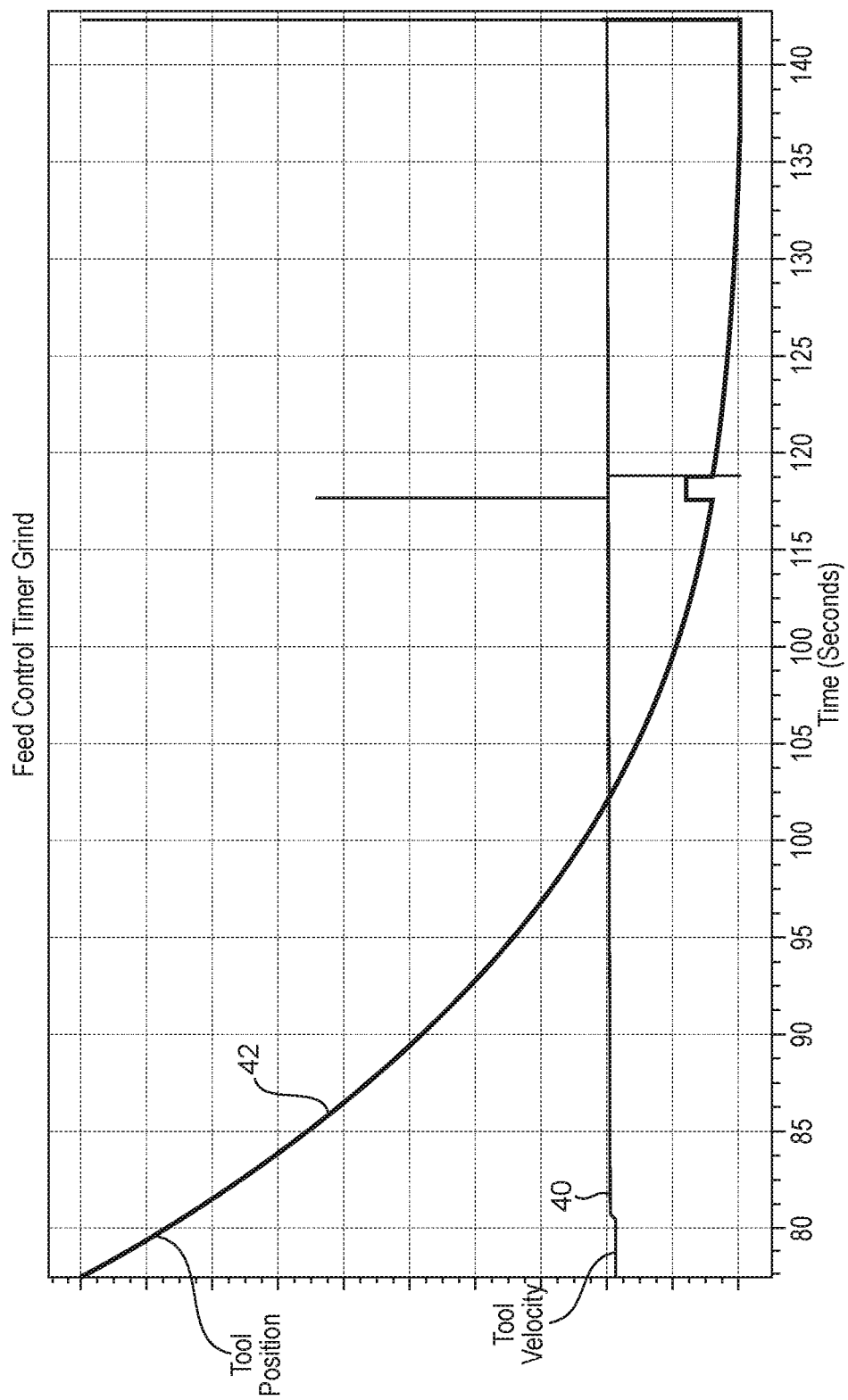
FIGS. 7 and 8 are plots of tool velocity and position against time for a machining operation embodying the invention which includes a pause for a measuring procedure, with a portion of the tool velocity plot of FIG. 7 shown in FIG. 8 with a larger scale on the vertical axis.
Figure 8:
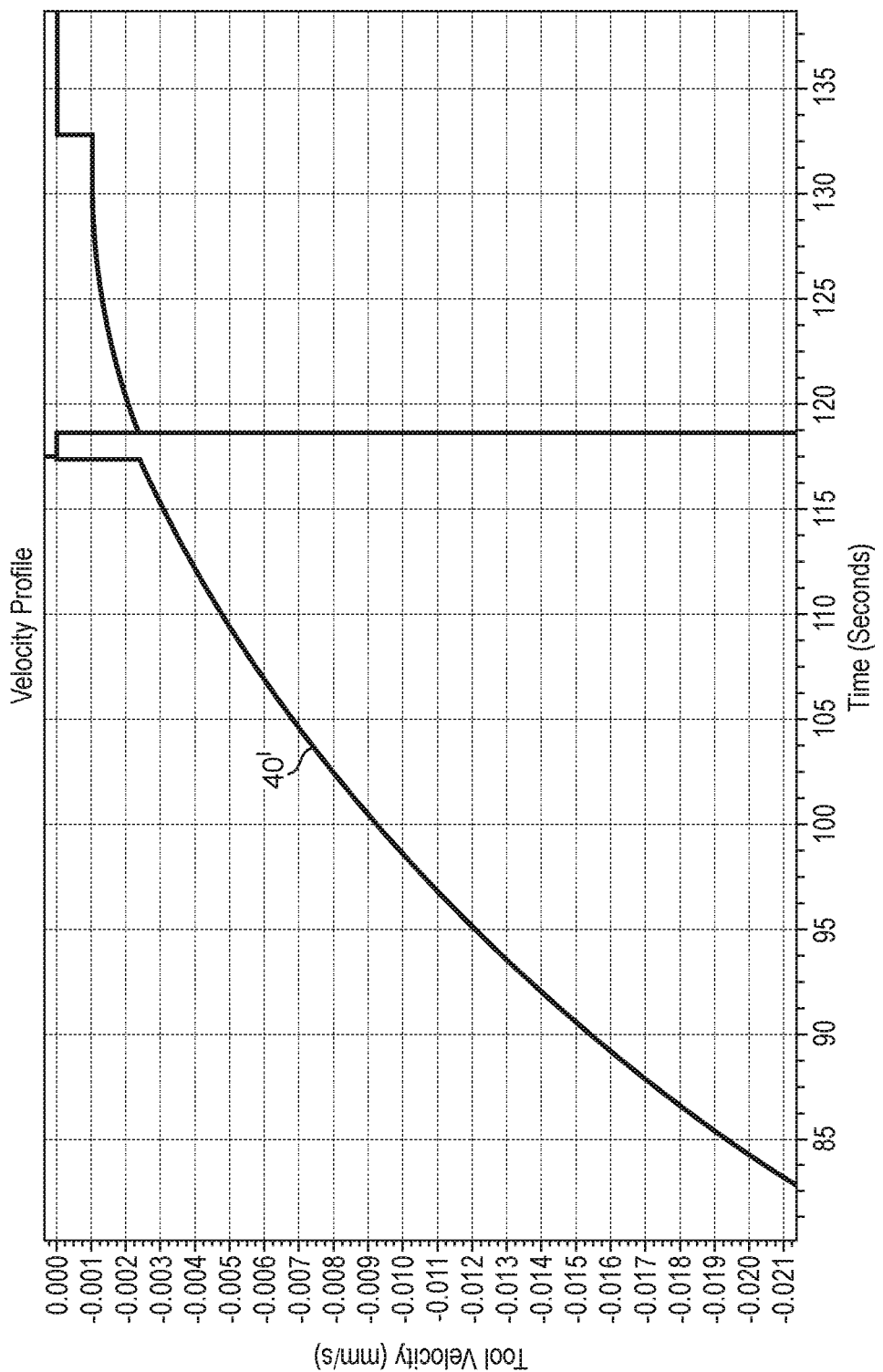

FIGS. 7 and 8 illustrate a machining operation according to an embodiment of the invention which includes a brief pause in the material removal whilst the size of the workpiece is measured using a size gauge partway through the machining operation. In FIG. 7, plot 40 is a plot of relative velocity between the tool and the workpiece against time. Plot 42 is a plot of tool position along an axis perpendicular to the workpiece against time. FIG. 8 shows plot 40' which is a portion of plot 40 shown with a larger scale on the vertical axis.

In this embodiment, a size gauge is applied to the workpiece when the tool feed position passes a predetermined point in the machining operation. This point may be defined with reference to the position of the tool along its machine axis such that sufficient stock is left on the workpiece to allow a satisfactory completion of the feed control from the point at which the gauge acquires information of its near complete size (designated as a "gauge grind"). The gauge reading provides compensation for the process and environmental size variations which may otherwise cause a loss of size accuracy in the previously described "timer grind".

When the predetermined point is reached, the infeed of the tool relative to the workpiece is suspended and the gauge is brought into contact with the workpiece for sufficient time to acquire the required size measurement. The distance to be travelled by the tool from the position reached during the preceding material removal process to its target, finish position is calculated with reference to the gauge measurement. The velocity profile for the remainder of the machining operation is then re-calculated on this basis. The revised velocity profile is modified relative to the previous version to take into account any difference between the current distance to size as indicated by the tool machine axis and the distance to size indicated by the gauge measurement.

Figure 9:
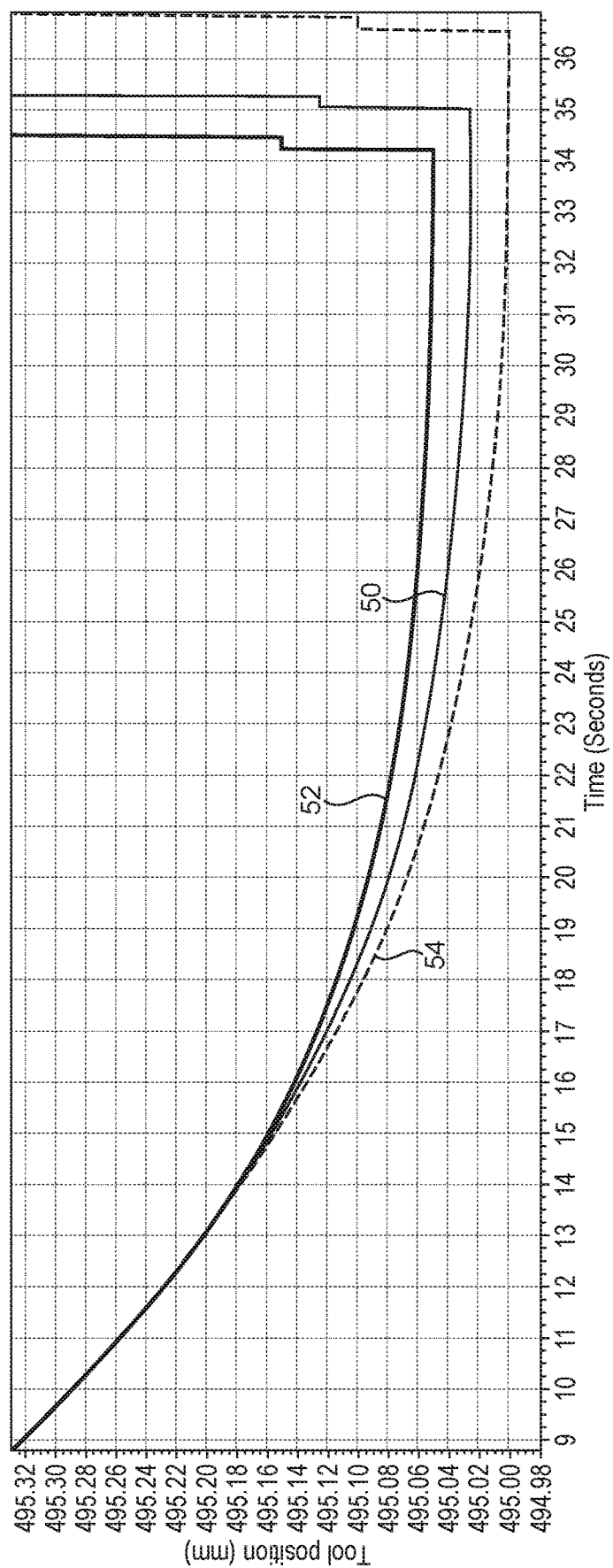
FIG. 9 is three plots of tool position against time showing different adjustments following a measuring operation.

FIG. 9 illustrates modification of the machining operation illustrated in FIGS. 7 and 8 according to two different scenarios. It can be seen that the gauge measurement was taken in this embodiment when the workpiece was around 150 microns above its finished size. The tool position profile corresponding to the original velocity profile for the part of the machining operation after the gauge measurement is shown as plot 50 in FIG. 9. Plot 52 shows the tool position profile corresponding to a recalculated velocity profile where the tool finishes the machining operation at a tool machine axis position which is further from the workpiece than originally calculated, as a result of the grinding wheel size being larger than expected. Alternatively, plot 54 shows the tool position profile corresponding to a revised velocity profile where the finish position of the tool along its machine axis is closer to the workpiece than originally calculated as the wheel size is smaller than expected.

Embodiments of the invention involving a different way of adjusting the velocity profile having regard to workpiece measurements carried out during the machining operation will now be described with reference to FIGS. 10 to 14.

Figure 10:
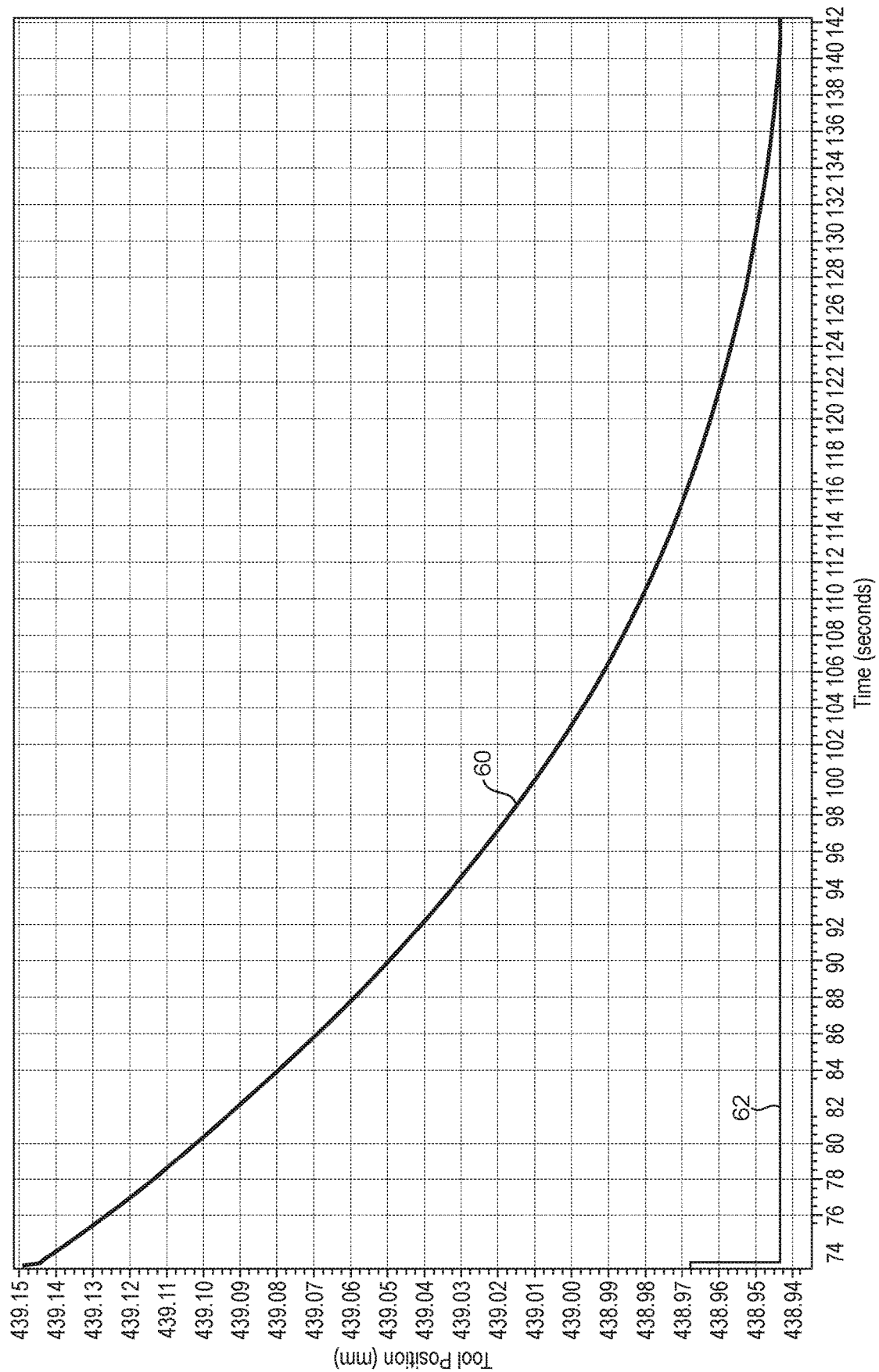
FIG. 10 shows plots of tool position and target end position against time for a machining operation embodying the invention.

For the purposes of comparison with subsequent plots, FIG. 10 shows a plot 60 of a tool position against time according to an embodiment of the invention, with the relative velocity between the tool and the workpiece decreasing continuously during the machining operation. Also shown on the graph is a plot 62 representing a target end position. The two plots 60 and 62 are generated using different vertical axes which have been overlaid for the purposes of this illustration. Similar considerations apply to the vertical axes of FIGS. 11 to 14.

Figure 11:
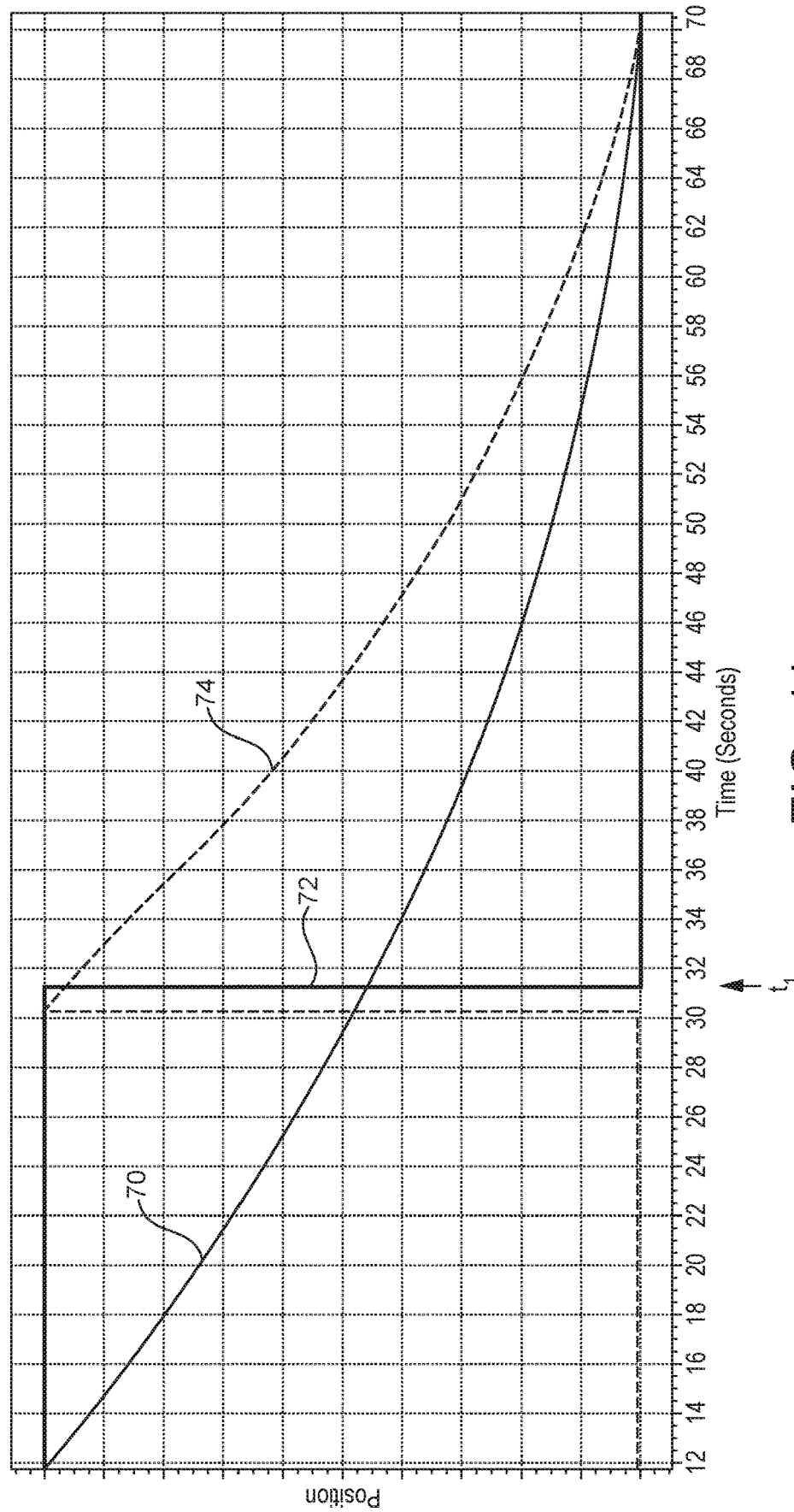
FIGS. 11 to 13 show plots of tool position, target end position and size gauge reading against time for three machining operations embodying the invention.

FIG. 11 illustrates the introduction of a size gauge reading partway through a machining operation. Plot 70 shows the tool position during the machining operation, plot 72 is the target end position, and plot 74 corresponds to the size gauge reading output.

In this example, the size gauge reading is found to indicate that the grinding wheel size is smaller than expected, and so the workpiece is larger than expected at this stage. Accordingly, the tool must travel further for the workpiece to reach the target size end-point. The control arrangement of the machine tool therefore carries out a calculation to determine where the tool needs to move to so that the workpiece will be ground to the correct size taking into account the size adjustment for the grinding wheel. This calculation results in a modification to the target end position, indicated by the vertical drop in the plot 72 shown in FIG. 11. This may be implemented by reducing the rate of decrease of the tool infeed velocity for a period to accommodate the extension to the target end position. Alternatively, it may result in the machining operation moving back along the relative velocity profile to a point where the feed velocity is higher. In this example, this movement is relatively small and so the change in the gradient of the tool position profile 70 shown in FIG. 11 at time $t_1$ is barely perceptible.

Figure 15:
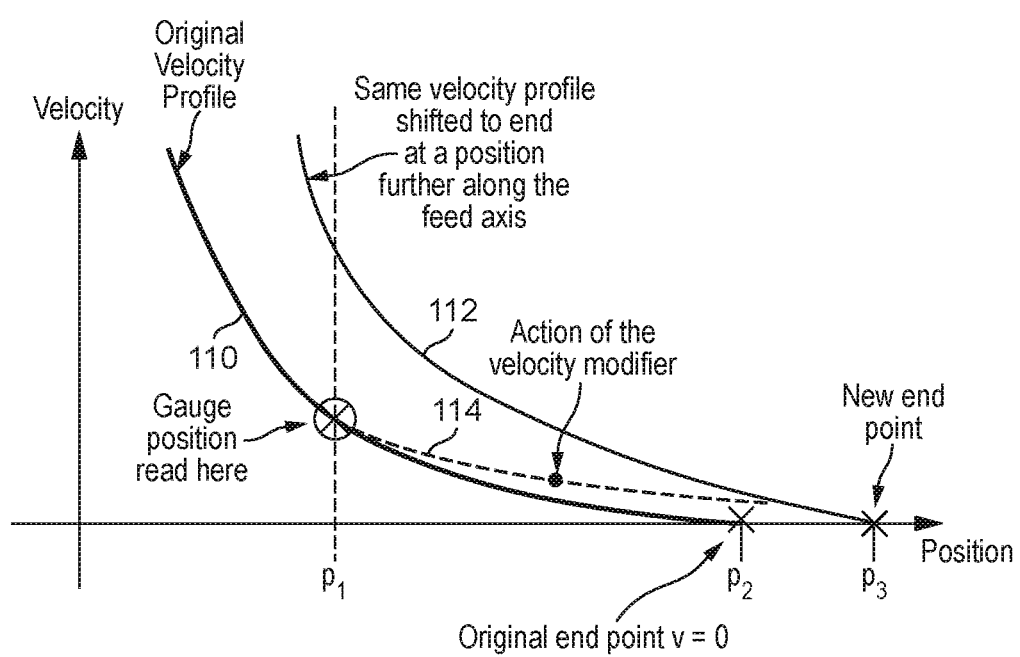
FIG. 15 is a sketched plot of tool velocity against position for a machining operation similar to that illustrated in FIG. 11.

FIG. 15 illustrates how a profile of velocity against position may be modified in the scenario to which FIG. 11 relates, that is, where the size gauge reading indicates that the grinding wheel size is smaller than expected. Initially the machining operation is following a velocity profile 110. This is calculated such that the operation is completed as the tool velocity reaches zero and the tool reaches the position $p_2$. At tool position $p_1$, a size gauge reading is taken which indicates that the grinding wheel is smaller than expected at this point. In response to this measurement, a velocity modifier parameter is calculated, which represents an amount by which the velocity profile is shifted along the position axis so that the end of the shifted profile (that is, when the tool velocity reaches zero) coincides with the tool reaching the position ($p_3$) where the workpiece has been ground to the correct size. The shifted profile 112 is shown in FIG. 15. The control arrangement calculates an intervening velocity profile 114 (shown by a dashed line in FIG. 15) which provides a smooth transition between the old velocity profile 110 and the shifted velocity profile 112. As a result, the velocity falls at a slower rate until it blends into the shifted velocity profile 112.

Figure 12:
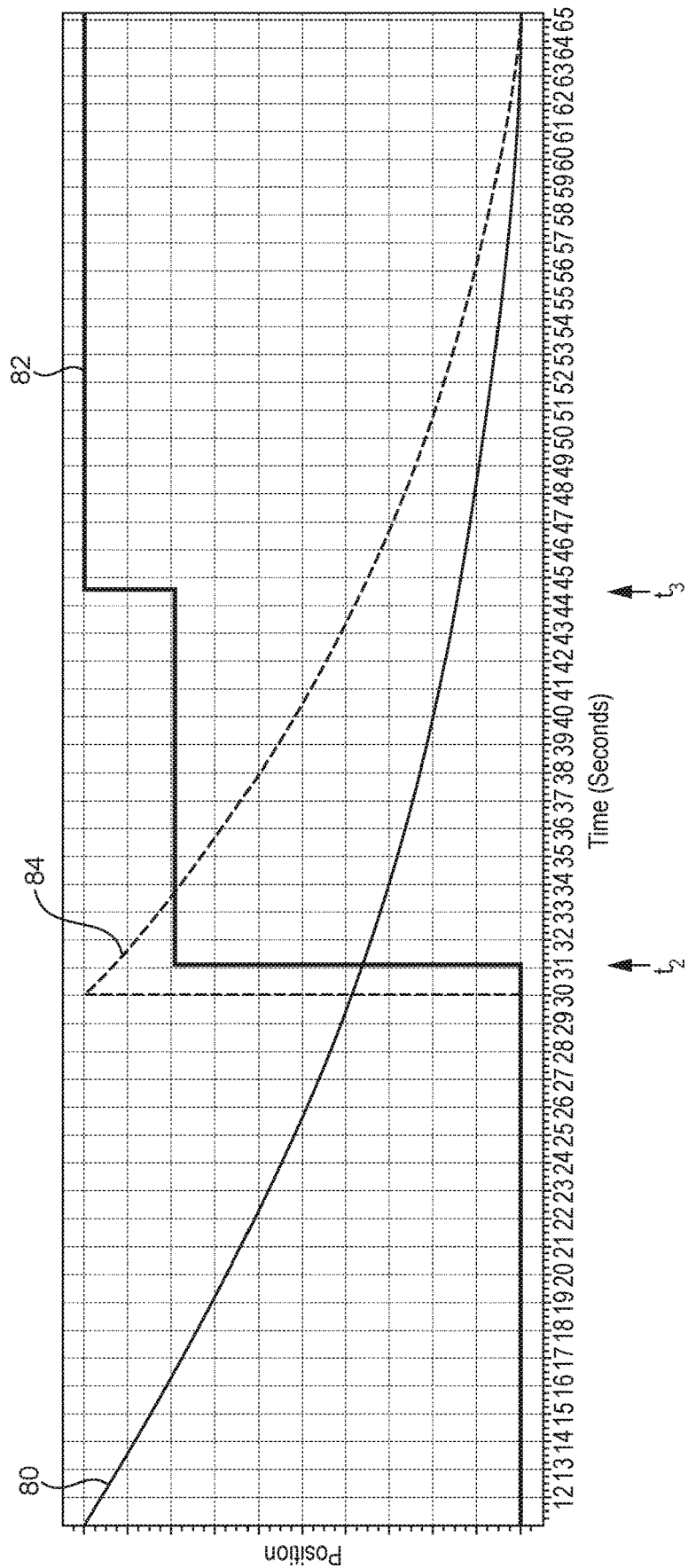

In contrast to the example of FIG. 11, in FIG. 12, the grinding wheel size is determined by the size gauge reading of the workpiece to be larger than expected. Accordingly, the tool must travel a shorter distance to machine the workpiece to the required size end-point. In FIG. 12, plot 80 is the tool position, plot 82 the target end position, and 84 the size gauge reading output. Following analysis of the size gauge reading, the target end position is modified at time $t_2$ causing the feed velocity to decrease more quickly than would otherwise be the case at this point. In this example, a second adjustment is made at time $t_3$. In each adjustment in this example, the current velocity is adjusted by moving further along the relative velocity profile, resulting in a greater reduction in the feed velocity than would otherwise be the case, with a view to the workpiece reaching the target size at the end of the machining operation.

Figure 13:
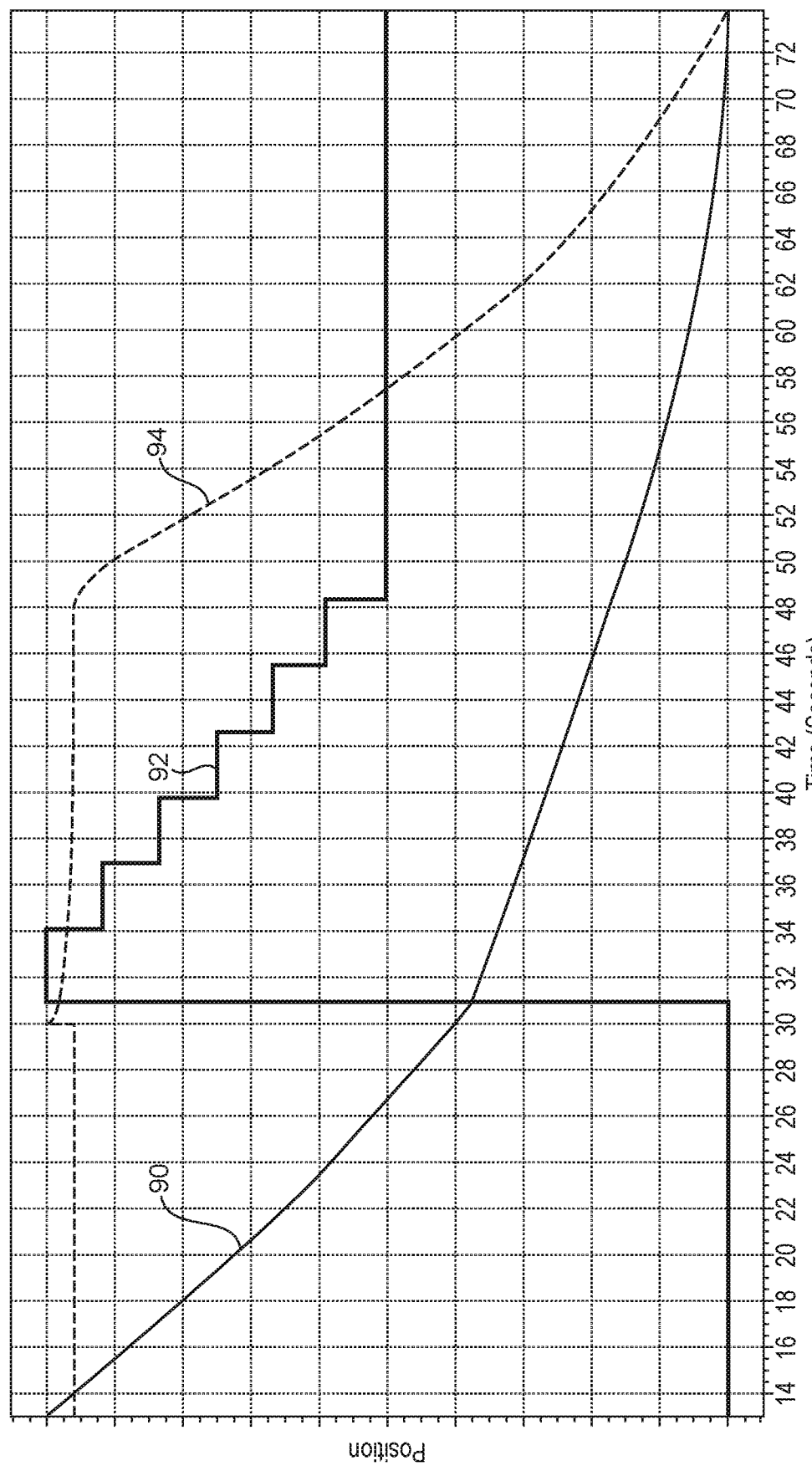

A further example is shown in FIG. 13, with plot 90 being the tool position, plot 92 the target end position, and plot 94 the size gauge reading output. As in the example of FIG. 12, in this case the grinding wheel size is found to be larger than expected. Again, the tool must travel a shorter distance to reach the target size end-point. In this example, the grinding wheel is not in contact with the workpiece until after the gauge has engaged with the workpiece. The first calculation by the control arrangement in response to the signal from the gauge causes a step change in the target end position at time $t_4$. A pronounced reduction in the relative velocity of the tool can be seen in the profile 90 at time $t_4$.

The control arrangement then determines in response to the signal from the size gauge that the initial estimate of the deviation from the expected workpiece size was too large. There follows six smaller corrections to the target end position between time $t_4$ and $t_5$ to enable the machine tool to move to a tool position where it is able to resume following the relative velocity profile such that the end-point of the profile coincides with the workpiece reaching the required size.

Figure 14:
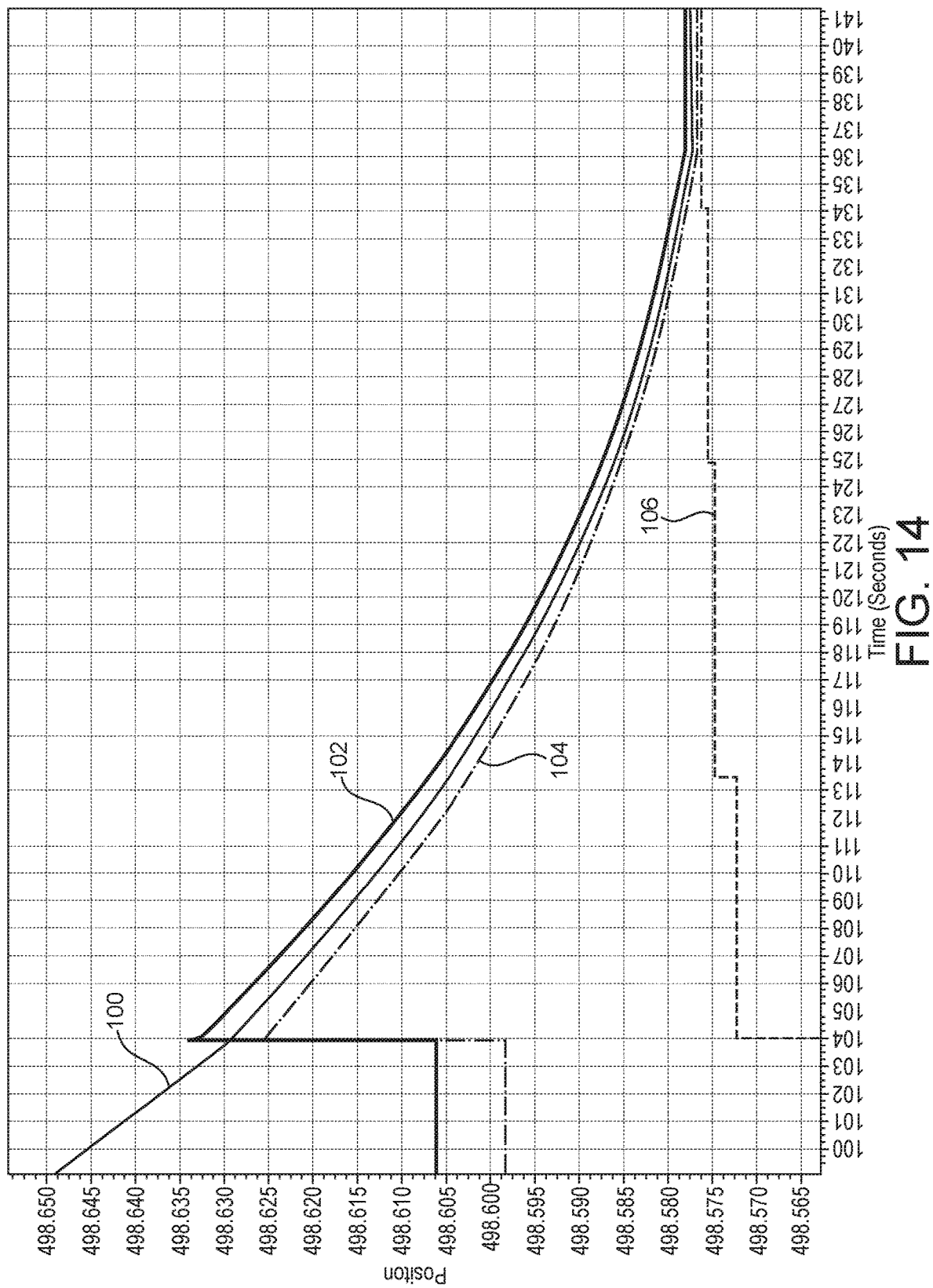
FIG. 14 shows plots of tool position, upper and lower tool position thresholds and the target end position against time according to a further machining operation embodying the invention.

FIG. 14 illustrates a further method embodying the invention. Plot 100 corresponds to the actual tool position. Plots 102 and 104 correspond to upper and lower thresholds respectively for the measured workpiece dimension through the course of the machining operation. Plot 106 shows the target end position. In this example, the feed compensation incorporated in the relative velocity profile is dependent on the degree to which the predicted end-point, as determined with reference to the size gauge output, is found to deviate from the desired position. The upper and lower thresholds define a control band around the workpiece size as measured by the size gauge, such that the relative velocity profile is only adjusted when the gauge reading falls outside the area limits defined by the control band. The width of the control band may reduce to improve the precision with which the relative velocity profile is adjusted, as the workpiece approaches its target size. If the workpiece size deviation falls outside the control band, a value for a velocity modifier parameter is determined which changes the feed rate, such that its position along the relative velocity profile is changed and the desired size is reached at the end of the machining operation. It can be seen that the target end position is adjusted four times in the example shown in FIG. 14.

As illustrated in FIG. 14, the effect of the modification of the infeed velocity and the recalculation of the target end position is to keep the tool position centralised in the error window. This results in smooth and accurate control of position and velocity during the machining operation, through to achievement of the desired workpiece size.

Where embodiments refer to tool movement relative to a workpiece, it will be appreciated that the teaching is also applicable to procedures involving movement of the workpiece relative to the tool instead (or in addition) in order to achieve the desired relative velocity profile.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

The invention claimed is:

1. A method of machining a workpiece using a machine tool, the machine tool comprising a tool mount carrying a tool, a workpiece mount carrying a workpiece, a drive mechanism for moving at least one of the tool mount and the workpiece mount relative to the other, and a control arrangement for controlling the drive mechanism, wherein the method comprises moving at least one of the tool mount and the workpiece mount with the drive mechanism under the control of the control arrangement so that:

the tool contacts a portion of the workpiece to commence a machining operation; and the tool then removes material from the portion of the workpiece until completion of the machining operation, the movement being such that the relative velocity between the tool and the workpiece decreases continuously during the majority of the time that the tool and the workpiece are in contact with each other during the machining operation, wherein at a predetermined point partway through the machining operation, at least one dimension of the portion of the workpiece being machined is detected, and a new relative velocity profile to be achieved between the tool and the workpiece over at least a portion of the remainder of the machining operation is determined by the control arrangement with reference to the detected dimension.

2. The method of claim 1, wherein the relative velocity between the tool and the workpiece decreases continuously during at least 80% of the time that the tool and the workpiece are in contact with each other during the machining operation.

3. The method of claim 1, wherein the machining operation is completed when the portion of the workpiece has been machined to a finished size by the tool.

4. The method of claim 1, wherein the control arrangement calculates a profile of relative velocity against time to be achieved between the tool and the workpiece over the course of the machining operation using a velocity profile generation algorithm.

5. The method of claim 4, wherein the relative velocity profile is calculated such that the relative velocity between the tool and the workpiece at the start of the machining operation corresponds to a material removal rate that is less than a predetermined specific material removal rate threshold.

6. The method of claim 4, wherein the velocity profile generation algorithm comprises a second or higher degree polynomial.

7. The method of claim 4, wherein the velocity profile generation algorithm comprises a term which decreases exponentially with respect to time.

8. The method of claim 4, wherein the relative velocity profile is calculated with reference to a plurality of predefined combinations of time and velocity.

9. The method of claim 4, wherein the relative velocity profile is calculated with reference to a plurality of predefined combinations of (a) the depth of material remaining to be removed from the workpiece and (b) fractions of the relative velocity achieved when the machining operation is commenced.

10. The method of claim 4, wherein the relative velocity profile is calculated using a spline fitting algorithm.

11. The method of claim 1, wherein removal of material from the workpiece is suspended during the step of detecting at least one dimension of the portion of the workpiece.

12. The method of claim 1, wherein removal of material from the workpiece by the tool continues during the step of detecting at least one dimension of the portion of the workpiece.

13. The method of claim 12, wherein the step of determining the new relative velocity profile comprises:

calculating a value of a velocity modifier parameter which corresponds to a displacement forwards or backwards in time along a current relative velocity profile, by reference to the difference between a measured size of the detected dimension and an expected size of the detected dimension at that point in the machining operation, the displacement being calculated to correct for this difference in order to achieve a desired final value of the dimension at the end of the machining operation; and adjusting a current position along the current relative velocity profile with reference to the calculated value of the velocity modifier parameter.

14. The method of claim 1, wherein the step of determining the new relative velocity profile comprises:

calculating a value of a velocity modifier parameter which corresponds to a displacement forwards or backwards in time along a current relative velocity profile, by reference to the difference between a measured size of the detected dimension and an expected size of the detected dimension at that point in the machining operation, the displacement being calculated to correct for this difference in order to achieve a desired final value of the dimension at the end of the machining operation; and adjusting a current position along the current relative velocity profile with reference to the calculated value of the velocity modifier parameter.

15. The method of claim 1, including a further step of:

determining an intervening velocity profile which provides a smooth transition between the current relative velocity profile and the new relative velocity profile.

16. The method of claim 1, wherein, after the dimension has been detected, the measured size of the detected dimension is compared to upper and/or lower threshold values for the expected size of the detected dimension at that point in the machining operation and a new relative velocity profile is only determined if the detected dimension is beyond one of the thresholds.

17. The method of claim 1, wherein the tool is a grinding wheel.

18. A machine tool comprising a tool mount for carrying a tool, a workpiece mount for carrying a workpiece, a drive mechanism for moving at least one of the tool and the workpiece relative to the other and a control arrangement configured to control the drive mechanism to carry out the method of claim 1.

19. A computer-readable medium storing computer-executable instructions adapted to cause the control arrangement of the machine tool to operate in accordance with the method of claim 1.

* * * * *